A. Barbarin.
Gas Lighting.
Nº 90,626. Patented Jun. 1, 1869.
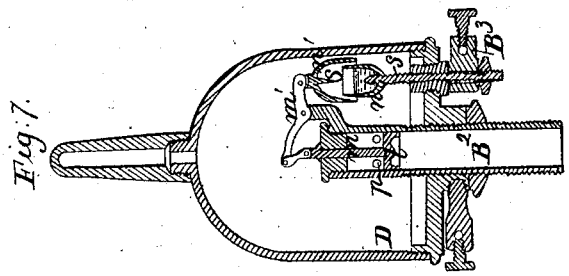
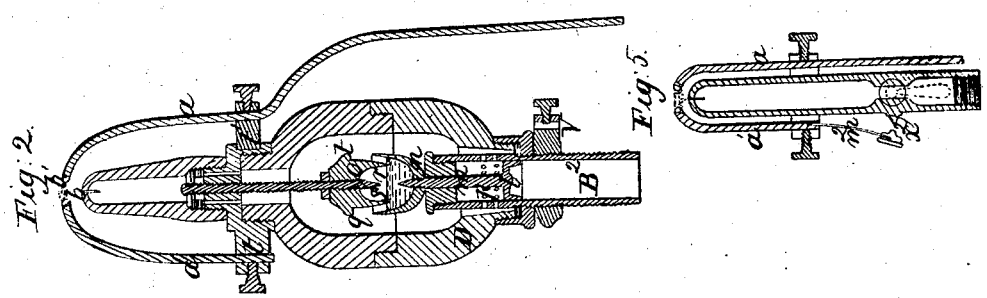
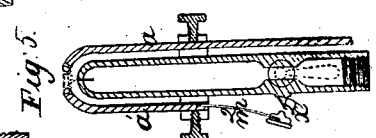
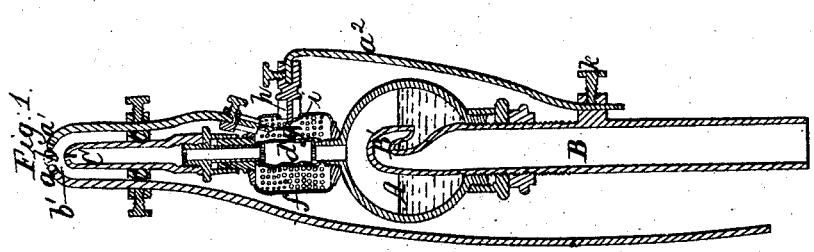
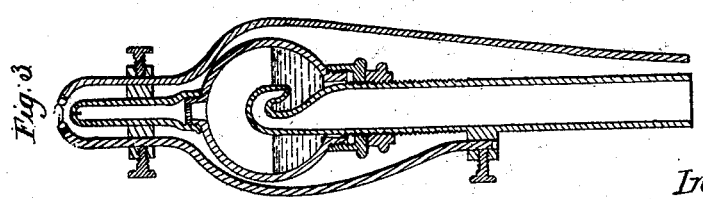
Witnesses:
Inventor;
Arthur Barbarin
by A. Pollok
his atty.

United States Patent Office.

ARTHUR BARBARIN, OF NEW ORLEANS, LOUISIANA.

Letters Patent No. 90,626, dated June 1, 1869.

---

IMPROVEMENT IN APPARATUS FOR LIGHTING GAS BY ELECTRICITY.

---

The Schedule referred to in these Letters Patent and making part of the same.

---

*To whom it may concern:*

Be it known that I, ARTHUR BARBARIN, of New Orleans, in the parish of Orleans, and State of Louisiana, have invented certain new and useful Improvements in Lighting Gas by Means of Electricity; and I hereby declare the following to be a full, clear, and exact description of the same, reference being had to the accompanying drawings, in which—

Figure 1 is a vertical central section of a gas-burner to which my improvements are applied.

Figure 2 is a like section of a modification of the same.

Figure 3 is a like section of a further modification.

Figures 4, 5, 6, and 7, are sectional views of gas-burners, showing the various means which may be employed to transmit the electric current by which the gas-lighting is effected.

My invention principally relates to the method of regulating and controlling the flow of gas to burners, as set out in Letters Patent recently granted me, and my object is to devise means, whereby the pressure of the gas, as it flows to the burner, may be used to close the electrical circuit, and thus either produce a spark or heat platinum wire or spongy platinum over the burner, so as to ignite the gas issuing therefrom.

My object is further to effect readily and simply the lighting of street-burners by means of electricity, at the same time rendering each burner entirely independent of the other, so far as the lighting of the gas and the flow of gas to the burner are concerned, so that if one lamp or burner be out of order, the rest will not be thereby affected.

All these features of my invention can best be explained and understood by reference to the drawings.

The gas-burner represented in fig. 2, is one in which the reservoir A, of quicksilver or other liquid, is combined with the bent end B B' of the gas induction pipe B, as described in the Letters Patent above mentioned.

The gas issuing from the burner C, is ignited by means of electricity passing through the wires $a$ $a^1$, arranged above the orifice of the burner, as seen in the figure.

The two wires are united by fine platinum wire $b$, provided on each side with a series of fine projecting points $b'$.

They are held to the burner in a yoke, $c$, of some non-conducting material, by means of binding-screws. The wire $a$ leads from the battery or other means for exciting an electrical current, and the wire $a^1$ connects with the ground through the medium of the gas-pipe A, and other devices which will now be described.

In order to effect the closing of the circuit only when the gas escapes from the burner, I interpose between the burner and the reservoir, a flexible tube or sack, $d$, of thin rubber or other suitable material capable of being distended by the pressure of the gas passing up into it from the reservoir. One end of this tube is attached to the neck of the reservoir, and the other is connected with the lower non-conducting end of the burner.

In order to prevent the tube or sack from being unduly stretched, I surround it by a wire-gauze, glass, porcelain, or metal case $f$, to the upper end of which the gas-burner is applied, as represented in the figure. To one side of the case $f$, the lower end of the wire $a^1$ is attached by means of a binding-screw which is seated in a stem of ivory or other non-conductor, when the case $f$ is of metal, which passes down into the interior of the case, and has hinged to it a lever or key, $g$, which connects with the wire $a^1$, by means of a conducting-wire passing through the ivory stem, used also when the case is of metal.

This key is so placed in the case $f$, that the sack or tube $d$, when inflated, will press the lower end of the key against a platinum point, $i$, of an insulating-stem, $h$, provided with a binding-screw which holds the wire $a^2$ connected at its lower end with the gas-pipe A, by means of a binding-screw, $k$.

When gas is discharged from the reservoir, it will distend the tube $d$, the opening in the lower end of the burner being somewhat smaller than the discharge-orifice in the reservoir, and the tube will consequently press the lower end of the key $g$ against the platinum or other metal point $i$. The circuit will now be complete between the battery and the ground, and the platinum wire and wire points, $b$ $b'$, consequently become at once sufficiently heated to ignite the gas issuing from the tip of the burner. When the flow of gas ceases, the sack $d$ will collapse, the key $g$ will consequently drop back, and the circuit being thus broken, the wire $b$ will no longer be heated.

In fig. 2, I have represented another device for obtaining the same results. In this figure I have omitted the reservoir A, which is fitted to the lower end of the pipe $B^2$.

To the upper end of this pipe $B^2$ is attached a case, D, of glass or other suitable material, into the interior of which the end of the pipe projects a suitable distance.

In the pipe is fitted a piston, $l$, the stem $m$ of which traverses the closed end of the pipe, and carries a small cup, $n$, from whose bottom the upper end of the stem projects a given distance. The piston is so arranged, that when, by reason of its weight, it drops until the base of the cup rests upon the closed end of pipe A, it will fall below one or more perforations or holes $p$ in the pipe.

In the upper part of the case D, is placed a block, $o$, of some non-conducting material, provided with a shoulder, $q$, against which the top of cup $n$ presses, when in an elevated position, and a tubular projecting piece, $r$, which fits within the cup, by which means the latter, when raised, is completely closed.

From the block projects a wire screw, $s$, intended to meet the point of the stem $m$, which wire screw connects with the stem $t$ on the exterior of the case D, in which the wire $a^1$ is held by means of a binding-screw. The burner is attached to the top of the case D, and is supplied with gas through orifices in the case around the block $o$. The arrangement of the wires $a$ $a^1$, and gas-lighting devices above the burner, may be similar to that already described, the battery-wire $a$ being insulated at the point $t'$ where it is attached to the burner.

The operation is as follows:

The gas, passing up around the reservoir, through pipe A, will press the piston upward, until the perforations $p$ are uncovered.

At this point the gas will pass through the perforations, up through the case D to the burner.

But the upward movement of the piston has been sufficient to bring the point of the stem $m$ in contact with the wire point $s$, thus closing the circuit, the connection with the ground being made through the wire V, below the case D. A little quicksilver may also be put in the cup, in order to insure the closing of the circuit.

The platinum wire $b$ will now become heated, and the gas, issuing from the burner, will at once be ignited.

When the pressure of gas is taken off, the piston $l$ will fall, the perforations $p$ will be closed, and the electrical circuit will be broken.

The arrangement of parts, shown in fig. 2, may be modified, as represented in fig. 7.

In this case the arrangement of the piston $l$ and the pipe $B^2$, with perforations $p$, is similar to that seen in fig. 2.

The stem $m$ of the piston, however, does not carry the mercury-cup $n$, but is linked to a hinged lever, $m'$, which carries on its other end an inverted cup or bell, $n'$, with a wire point, $s$.

Immediately under this cup is placed the mercury-cup $n$, provided with a central screw-wire, $s'$, which connects with the binding-screw $B^3$.

The gas, when turned on, will force up the piston, and the arm of the lever $m'$, to which it is attached, the other arm of the lever will be correspondingly depressed, and the cup $n'$ will be lowered toward the mercury-cup $n$, so as to form the required connection between the points $s$ $s'$, as in the instance previously mentioned.

In fig. 3 is shown an arrangement for street-gas lighting, in which the platinum wire $b$ and wire points $b'$ are kept constantly heated.

The wire $a$ is in communication with the battery, and the wire $a^1$ connects with the ground through the medium of the gas-pipe, the circuit being thus constantly closed.

In order to render each lamp independent of all others, I make use of an earth-battery, composed of plates of zinc, and copper, and coke, buried to a suitable depth in the earth at the base of the lamp.

Any ordinary arrangement of an earth-battery will suffice, or one of Hare's or Poaillet's battery-arrangements, or other constant battery can be used.

For gas-lighting purposes, under my invention, I require a current of but little intensity, as when I employ spongy platinum over the gas-burner, it requires but little heat in order to bring about the combination of the oxygen of the atmosphere with the hydrogen of ordinary coal-gas, and so, in case the gas is carburetted hydrogen, spongy platinum and platinum wire require but little heat in order to ignite the gas.

By thus using an earth or other battery for each lamp, I make each burner independent of the rest, so that, although the circuit in one be out of order, the others will in nowise be affected thereby.

In fig. 6 is represented a modification of the gas-lighting device.

The battery-wire $a$ is insulated, and the wire $a^1$ connects with the ground, thus keeping the circuit closed.

Between the contiguous ends of the two wires, and over the orifice in the top of the burner, I stretch a thread of asbestos, upon which I secure beads of ordinary platinum or spongy platinum.

The asbestos, of course, is not affected by the heat of the flame, and the platinum beads will at once facilitate the passage of the electrical spark, so that gas can be ignited with great ease and certainty.

In conclusion, I would state that I am aware that the principle of furnishing a supply of electricity, by means of an independent battery with each burner, is not new, and I make no broad claim to it, my invention, in this direction, being confined to the manner in which such battery is combined with a burner of the kind hereinbefore specified.

It will be understood, that instead of making use of an induction-coil, I can employ frictional or free electricity. In such case, even if the wires $a$ $a^1$ be disconnected, a spark can be thrown across, sufficient to ignite the gas.

And, in the place of platinum, I can use palladium, rhodium, iridium, or other metals, possessing like characteristics.

At all points, where heat is excessive, or where the circuit is closed and broken, the ends of ordinary brass or other wires should be tipped with platinum or its equivalent.

And, finally, it will be seen, that the principle of utilizing the pressure of the gas passing to the burner, for the purpose of closing the circuit, may be applied in many ways; and, therefore, while illustrating the manner in which the principle may be carried into effect, I do not limit my claim to the special devices herein described.

What I claim, and desire to secure by Letters Patent, is—

1. The method of closing the circuit in an electrical gas-lighting apparatus, by means of the pressure of the gas escaping to the burner, acting upon a lever, key, or piston, or equivalent circuit closed, substantially as herein shown and specified.

2. The method of street-gas lighting, by the employment, in connection with each burner, in which the flow of the gas is regulated by means of a reservoir of quicksilver or other suitable liquid, in combination with the gas-induction pipe, as herein described, of an independent battery, combined and arranged to operate with the gas-lighting apparatus over the burner, as and for the purposes herein set forth.

3. Connecting the ends of the wires $a$ $a^1$, by means of an asbestos thread, carrying beads of platinum, or its equivalent, and arranged above the orifice in the tip of the gas-burner, as described.

In testimony whereof, I have signed my name to this specification, before two subscribing witnesses.

ARTHUR BARBARIN.

Witnesses:
M. BAILEY,
WM. H. McCABE.